Dec. 7, 1926.
P. MacMILLAN ET AL
1,609,483
GAS BURNER
Filed Feb. 9, 1924
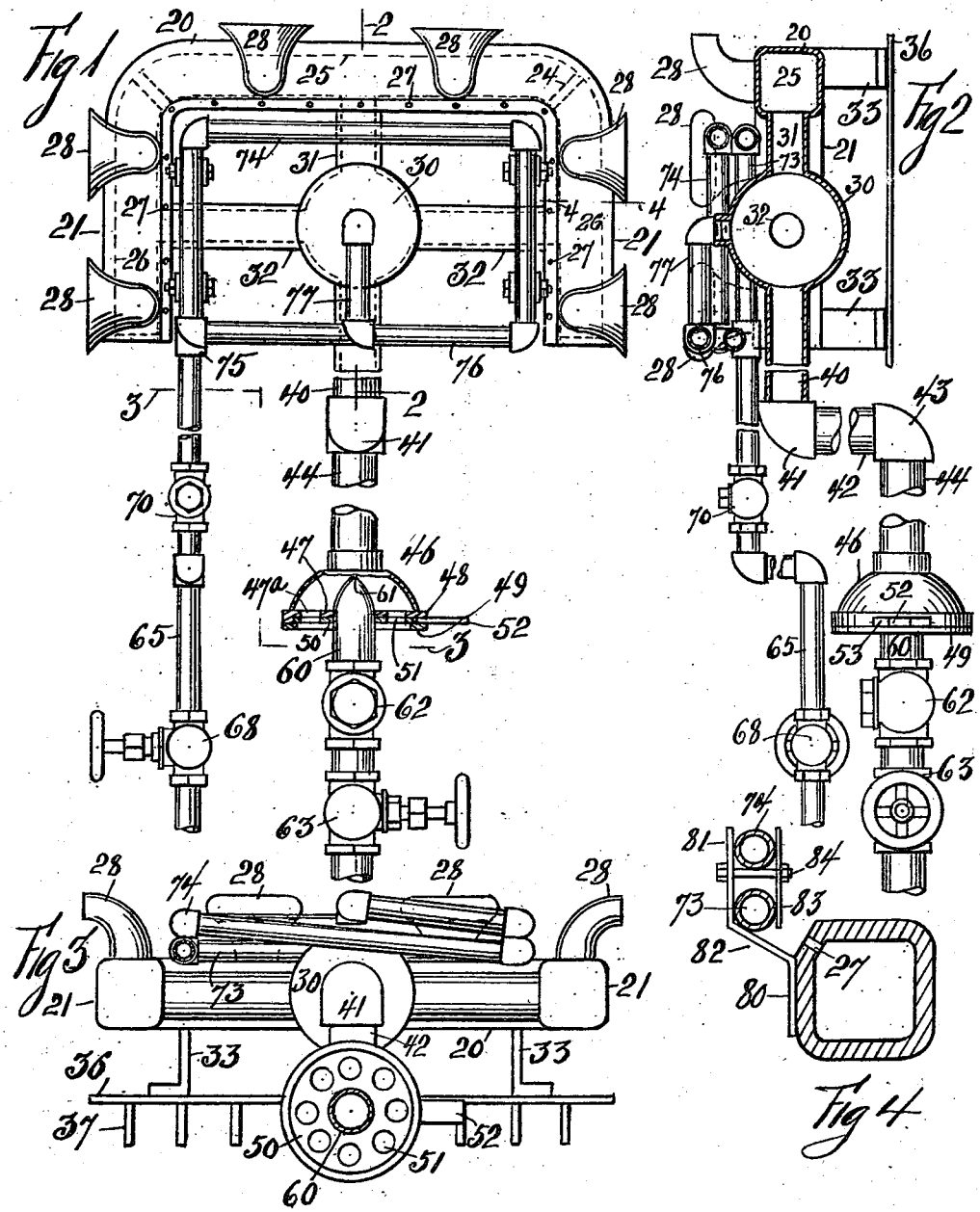

Patented Dec. 7, 1926.

1,609,483

UNITED STATES PATENT OFFICE.

PETER MacMILLAN AND EDWARD NORRING, OF BROOKLYN, NEW YORK.

GAS BURNER.

Application filed February 9, 1924. Serial No. 691,703.

This invention relates to a gas burner. Its object is the production of a burner, whereby a mixture of gas, which may be either illuminating or heating, air and steam can be mixed for the fuel of the burner.

The organization of the invention comprises a housing with a chamber or chambers, that are connected to a mixing chamber for the fuel of the burner. An air chamber is connected to gas piping, which latter is connected to said mixing chamber. A pipe grid is located adjacent to openings in the said housing to evaporate water into steam which latter is conducted to the mixing chamber.

In the accompanying drawings Fig. 1 represents a top plan view of an exemplification of the burner; Fig. 2 shows a side view and section of Fig. 1 on the line 2, 2; Fig. 3 indicates a front view of the burner and a section of Fig. 1 on the broken line 3, 3 and Fig. 4 shows an enlarged section of Fig. 1 on the line 4, 4.

The burner in this instance is shown to comprise a hollow U-shaped housing having the longitudinal member 20 with the members 21 at right angles thereto. One chamber may be formed in the housing or partition walls 24 may divide it into the chamber 25 and the pair of chambers 26. Fuel outlets 27 are formed in the wall of the housing. Flame mouth pieces 28 extend from the chambers 25 and 26.

A mixing chamber is indicated at 30 and conduits 31 and 32 respectively connect the said mixing chamber with the chambers 25 and 26. Legs 33 extend from the housing of the burner. A plate 36 is located upon the grate 37 of a furnace (not shown) in which the burner is used and the said legs 33 bear upon said plate.

A conduit 40 extends from the mixing chamber 30 and has connected thereto the elbow 41. A vertical pipe 42 extends from the elbow 41 and an elbow 43 is connected to the lower end of the pipe 42. A horizontal pipe 44 extends from the elbow 43. An air chamber 46 is connected to the pipe 44. The air chamber has formed therewith the plate 47 having the openings 47ª and the annular flange 48. An annular flange 49 is detachably connected to the flange 48. A damper comprises the damper plate 50 having the openings 51 and the operating handle 52. The damper plate 50 is located between plate 47 and the flange 49. An opening 53 is formed in the flanges of the plates 48 and 49 to provide clearance for the movements of the operating handle 52. The openings 47ª formed in the plate 47 can register with the openings 51 of the damper plate 50.

A gas pipe 60 extends through the plate 47 and has formed therewith the gas outlet tip 61. A check valve 62 and a valve 63 are connected to the gas pipe 60.

A water pipe 65 is shown with the valve 68 and the check valve 70. A pipe grid is indicated with the rectangular lower member 73 and the upper member 74. The lower member 73 is connected to the pipe 65 by means of the coupling 75, and from the upper member 74 extends the piping 76, 77. The latter is connected to the mixing chamber 30. Brackets 80 with the upper members 81 and the inclined members 82 extend from the members 20 and 21 of the housing of the burner. Plates 83 are connected to members 81 by means of the bolts 84. The members 73 of the pipe grid is supported on the members 82 of the brackets 80 and the member 74 is supported on the bolts 84.

To operate the burner the valve 63 is opened to direct a flow of gas into the mixing chamber 30 whereby a flow of air enters the openings 51 of the air chamber and enters the said mixing chamber 30. The volume of air admitted is controlled by the location of the damper plate 50, the position of which latter is controlled by the operating handle 52. By means of the handle 52 the area through the openings 51 and the corresponding openings in the plate is adjustably controlled. The valve 68 is opened by means of which water flows into the members 73 and 74 of the pipe grid. The gas escaping from the outlets 27 and the flame mouth pieces 28 is lit.

By this means the water in the grid is converted into steam before it enters the mixing chamber 30. The said steam mixes with the gas and air in the said mixing chamber, and the mixture of steam, gas and air flows from the flame mouth pieces whereas already stated it is lit and burns to produce an efficient burning medium.

Having described our invention what we desire to secure by Letters Patent and claim is:

1. In a burner the combination of a housing having chambers with fuel outlets, a mixing chamber adjacent to the housing, conduits connecting the mixing chamber and the chambers of the housing, piping for gas connected to the mixing chamber, an air chamber connected to the said piping, a damper in the air chamber to control the inflow of air to the air chamber, a pipe grid for the housing adjacent to the fuel outlets thereof, said pipe grid connected to the mixing chamber and flame mouth pieces extending from the housing and connected to the chambers thereof.

2. In a burner the combination of a U-shaped housing with a longitudinal member and members at right angles thereto, said housing having chambers and fuel outlets, a mixing chamber between the members of the housing, conduits connecting the mixing chamber and the chambers of the housing, piping for gas connected to the mixing chamber, an air chamber for the inflow of air connected to said piping, a damper in the air chamber to control the inflow of air to the air chamber and to said mixing chamber, a pipe grid over the housing adjacent to the fuel outlets thereof, piping connecting said grid and mixing chamber, piping for water connected to said pipe grid and flame mouth pieces extending from the housing and connected to the chambers thereof.

Signed at the borough of Manhattan, city of New York, in the county of New York and State of New York this 2nd day of February A. D. 1924.

PETER MacMILLAN.
EDWARD NORRING.